(12) United States Patent
Sugano

(10) Patent No.: US 9,499,206 B2
(45) Date of Patent: Nov. 22, 2016

(54) VEHICLE REAR STRUCTURE

(71) Applicant: TOYOTA JIDOSHA KABUSHIKI KAISHA, Toyota-shi, Aichi-ken (JP)

(72) Inventor: Chitoshi Sugano, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/435,197

(22) PCT Filed: Oct. 25, 2013

(86) PCT No.: PCT/JP2013/079031
§ 371 (c)(1),
(2) Date: Apr. 13, 2015

(87) PCT Pub. No.: WO2014/065415
PCT Pub. Date: May 1, 2014

(65) Prior Publication Data
US 2015/0251701 A1    Sep. 10, 2015

(30) Foreign Application Priority Data

Oct. 25, 2012 (JP) ................................. 2012-235615

(51) Int. Cl.
| | |
|---|---|
| B62D 21/15 | (2006.01) |
| B62D 25/02 | (2006.01) |
| B62D 25/04 | (2006.01) |
| B62D 25/08 | (2006.01) |
| B60K 15/04 | (2006.01) |
| B60R 22/34 | (2006.01) |

(52) U.S. Cl.
CPC ............. *B62D 21/152* (2013.01); *B60K 15/04* (2013.01); *B60R 22/34* (2013.01); *B62D 25/02* (2013.01); *B62D 25/04* (2013.01); *B62D 25/088* (2013.01)

(58) Field of Classification Search
CPC ...... B62D 25/02; B62D 25/04; B62D 25/08; B62D 25/087; B62D 25/088; B62D 21/152
USPC ............. 296/187.11, 193.05, 193.08, 203.04
See application file for complete search history.

(56) References Cited

U.S. PATENT DOCUMENTS

| | | | | |
|---|---|---|---|---|
| 4,968,087 A | * | 11/1990 | Goria ..................... | B62D 65/04 296/193.04 |
| 5,810,428 A | * | 9/1998 | Maki ..................... | B62D 25/04 296/187.05 |

(Continued)

FOREIGN PATENT DOCUMENTS

| | | |
|---|---|---|
| JP | H07-31573 U | 6/1995 |
| JP | H10-218030 A | 8/1998 |

(Continued)

*Primary Examiner* — Gregory Blankenship
(74) *Attorney, Agent, or Firm* — Oliff PLC

(57) ABSTRACT

In a vehicle to which a vehicle rear structure is applied, a rear roof-side inner of a roof-side inner is joined to a front roof-side inner of the roof-side inner at locations of first joins, of an overlap flange. Configuration is thereby such that strength is high at the overlap flange of the roof-side inner. Moreover, the rear roof-side inner is joined to both the front roof-side inner and the upper support at the location of a second join of the overlap flange. This enables upthrust load from a rear suspension to be effectively transmitted to the overlap flange, and distributed to the front roof-side inner and the rear roof-side inner. This enables rigidity of the roof-side inner to be secured.

5 Claims, 3 Drawing Sheets

(56) References Cited

U.S. PATENT DOCUMENTS

| | | | | |
|---|---|---|---|---|
| 6,896,319 B1* | 5/2005 | Huang | ............... | B62D 21/12 |
| | | | | 296/193.04 |
| 7,866,738 B2* | 1/2011 | Andou | ............... | B62D 25/04 |
| | | | | 296/193.05 |
| 2007/0138837 A1* | 6/2007 | Tomioka | ............ | B62D 25/02 |
| | | | | 296/203.04 |
| 2008/0007093 A1 | 1/2008 | Andou et al. | | |
| 2011/0309657 A1* | 12/2011 | Hutter | ................ | B62D 25/04 |
| | | | | 296/193.06 |
| 2013/0169006 A1* | 7/2013 | Sera | .................. | B62D 25/087 |
| | | | | 296/203.04 |
| 2014/0152054 A1* | 6/2014 | Yano | ................. | B62D 25/087 |
| | | | | 296/193.08 |
| 2014/0284967 A1* | 9/2014 | Torii | .................. | B62D 21/157 |
| | | | | 296/193.06 |
| 2015/0217809 A1* | 8/2015 | Kisaku | ............. | B62D 25/087 |
| | | | | 296/193.05 |
| 2015/0251701 A1* | 9/2015 | Sugano | ............. | B62D 25/02 |
| | | | | 296/193.05 |

FOREIGN PATENT DOCUMENTS

| | | |
|---|---|---|
| JP | 2011-207421 A | 10/2011 |
| JP | 2012-116408 A | 6/2012 |

* cited by examiner

VEHICLE REAR STRUCTURE

TECHNICAL FIELD

The present invention relates to a vehicle rear structure.

BACKGROUND ART

In an automobile rear vehicle body structure described in Japanese Patent Application Laid-Open (JP-A) No. 2011-207421 (Patent Document 1), pillar reinforcement is disposed inside a rear pillar, and a closed pillar cross-section is formed by the pillar reinforcement and a pillar inner panel (a roof-side inner). This thereby secures rigidity of the pillar reinforcement against an upthrust load from a rear suspension. Other related documents are: JP-A No. 2012-116408 (Patent Document 2), JP-A No. H10-218030 (Patent Document 3), and Japanese Utility Model Application Laid-Open (JP-U) No. H07-31573 (Patent Document 4).

SUMMARY OF INVENTION

Technical Problem

However, in vehicles in which there is a short overhang at the vehicle rear, sometimes such pillar reinforcement cannot be installed inside the rear pillar, since the rear pillar vehicle longitudinal direction width dimension is shortened. Namely, rigidity of the pillar inner panel (roof-side inner) against the upthrust load from the rear suspension cannot always be secured by pillar reinforcement.

It is therefore desirable to have a structure that secures the rigidity of the pillar inner panel against the upthrust load from the rear suspension, even in such cases.

In consideration of the above circumstances, an object of the present invention is to provide a vehicle rear structure that can secure rigidity of a roof-side inner against an upthrust load from a rear suspension.

Solution to Problem

A vehicle rear structure according to a first aspect includes: an upper support disposed at a vehicle upper side of a rear suspension; a front side member that configures a vehicle front side portion of a roof-side inner provided at the vehicle upper side of the upper support, that is joined to the upper support, and that extends from the upper support toward the vehicle upper side; and a rear side member that configures a vehicle rear side portion of the roof-side inner, that includes an overlap portion overlapping with a rear edge of the front side member and extending along the rear edge, that is joined to the front side member at the location of a first join on the overlap portion, and that is joined to the front side member and the upper support at the location of a second join on the overlap portion.

In the vehicle rear structure according to the first aspect, the upper support is disposed at the vehicle upper side of the rear suspension, and the roof-side inner is provided at the vehicle upper side of the upper support. The roof-side inner is configured including the front side member configuring the vehicle front side portion of the roof-side inner, and the rear side member configuring the vehicle rear side portion of the roof-side inner. The front side member is joined to the upper support, and extends from the upper support toward the vehicle upper side.

The rear side member includes the overlap portion, and the overlap portion overlaps with the rear edge of the front side member and extends along the rear edge. The rear side member is joined to the front side member at the location of the first join on the overlap portion. The overlap portion of the roof-side inner is thereby configured with high strength, enabling rigidity of the roof-side inner against an upthrust load from the rear suspension to be increased by the overlap portion.

The rear side member is joined to the front side member and the upper support at the location of the second join on the overlap portion. Namely, the front side member, the rear side member and the upper support are joined together at the second join. The upthrust load from the rear suspension is thereby effectively transmitted from the upper support to the overlap portion, and distributed to the front side member and the rear side member. This enables the rigidity of the roof-side inner against the upthrust load from the rear suspension to be secured.

A vehicle rear structure according to a second aspect is the vehicle rear structure according to the first aspect, wherein the rear side member is disposed distanced from the upper support toward the vehicle upper side at the vehicle rear side of the second join.

In the vehicle rear structure according to the second aspect, since the rear side member is disposed distanced from the upper support toward the vehicle upper side at the vehicle rear side of the second join, a gap is formed between the upper support and the rear side member. The gap can be utilized as a working hole for use when, for example, attaching a fuel inlet (fuel inlet box) or the like to the vehicle width direction outside of the roof-side inner.

Moreover, since the gap is formed at the vehicle rear side of the second join, the rear side member is joined to the upper support at the vehicle front side of the gap. This enables deformation of the roof-side inner due to the upthrust load from the rear suspension to be suppressed, even though the gap is formed between the upper support and the rear side member.

A vehicle rear structure according a third aspect is the vehicle rear structure according to the first aspect or the second aspect, wherein a seatbelt retractor and a fuel inlet are provided at the vehicle width direction outside of the roof-side inner, and the seatbelt retractor and the fuel inlet are disposed overlapping each other in the vehicle height direction in side view.

In the vehicle rear section structure according to the third aspect, the seatbelt retractor and the fuel inlet provided at the vehicle width direction outside of the roof-side inner are disposed overlapping each other in the vehicle height direction in side view. This enables setting of a shorter dimension of the roof-side inner in the vehicle longitudinal direction (enables setting of a shorter overhang at the rear section of the vehicle).

In cases in which the seatbelt retractor and the fuel inlet box are disposed overlapping each other in the vehicle height direction in side view in this manner, it is sometimes difficult, for example, to extend a reinforcement member in the vehicle height direction to form a closed cross-section with the roof-side inner at the vehicle width direction outside of the roof-side inner to reinforce the roof-side inner. It is therefore difficult to secure rigidity of the roof-side inner against the upthrust load from the rear suspension using such a reinforcement member. However, rigidity of the roof-side inner is secured by the overlap portion. This enables the rigidity of the roof-side inner to be effectively secured against the upthrust load from the rear suspension in vehicles in which a short overhang is set.

A vehicle rear structure according a fourth aspect is the vehicle rear structure according to the third aspect, wherein a hole where the seatbelt retractor is disposed is formed at the vehicle front side of the second join of the front side member, the rear side member includes plural first joins, and at least one of the first joins is disposed at the vehicle rear side of the hole and at the vehicle upper side of the second join.

In the vehicle rear structure according to the fourth aspect, a hole where the seatbelt retractor is disposed is formed to the front side member, and the hole is disposed at the vehicle front side of the second join. Namely, the second join is disposed at the vehicle rear side of the hole. The rear side member includes plural first joins, and at least one of the plural first joins is disposed at the vehicle rear side of the hole and at the vehicle upper side of the second join. This enables the first join and the second join to be disposed aligned with each other in the vehicle height direction at the vehicle rear side of the hole. A vehicle rear side portion of the hole in the front side member is thereby reinforced by the portion between the first join and the second join of the overlap portion. This enables deformation of the hole in the front side member due to the upthrust load from the rear suspension to be suppressed, even though the hole is provided to the front side member in order to dispose the seatbelt retractor.

A vehicle rear structure according a fifth aspect is the vehicle rear structure according to the fourth aspect, wherein a bead that extends so as to run along a line passing through the at least one first join and the second join is formed to the overlap portion between the at least one first join and the second join.

In the vehicle rear structure according to the fifth aspect, a bead is formed to a portion of the overlap portion between the first join and the second join disposed at the vehicle rear section of the hole, and the bead extends so as to run along a line passing through the first join and the second join. Since strength is increased at this portion of the overlap portion, deformation of the hole in the front side member due to the upthrust load from the rear suspension can accordingly be further suppressed.

A vehicle rear structure according a sixth aspect is any one of the first aspect to the fifth second aspect, wherein the second join and the rear suspension are disposed overlapping each over in the vehicle height direction in side view.

In the vehicle rear structure according to the sixth aspect, since the second join and the rear suspension are disposed overlapping each over in the vehicle height direction in side view, the upthrust load from the rear suspension can be even more effectively transmitted to the second join, and distributed to the front side member and the rear side member.

Advantageous Effects of Invention

The vehicle rear structure according to the first aspect enables the rigidity of the roof-side inner to be secured against the upthrust load from the rear suspension.

The vehicle rear structure according to the second aspect enables ease of operation to be improved by forming the gap between the upper support and the rear side member, and enables deformation of the roof-side inner due to upthrust load from the rear suspension to be suppressed, even though the gap is formed.

The vehicle rear structure according to the third aspect enables the rigidity of the roof-side inner to be effectively secured against the upthrust load from the rear suspension in vehicles where a short overhang is set.

The vehicle rear structure according to the fourth aspect enables deformation of the hole in the front side member due to upthrust load from the rear suspension to be suppressed, even though the hole is provided in the front side member in order to dispose the seatbelt retractor.

The vehicle rear structure according to the fifth aspect enables deformation of the hole in the front side member due to upthrust load from the rear suspension to be further suppressed.

The vehicle rear structure according to the sixth aspect enables the upthrust load from the rear suspension to be even more effectively transmitted to the second join, and distributed to the front side member and the rear side member.

DESCRIPTION OF EMBODIMENTS

Figure 1:
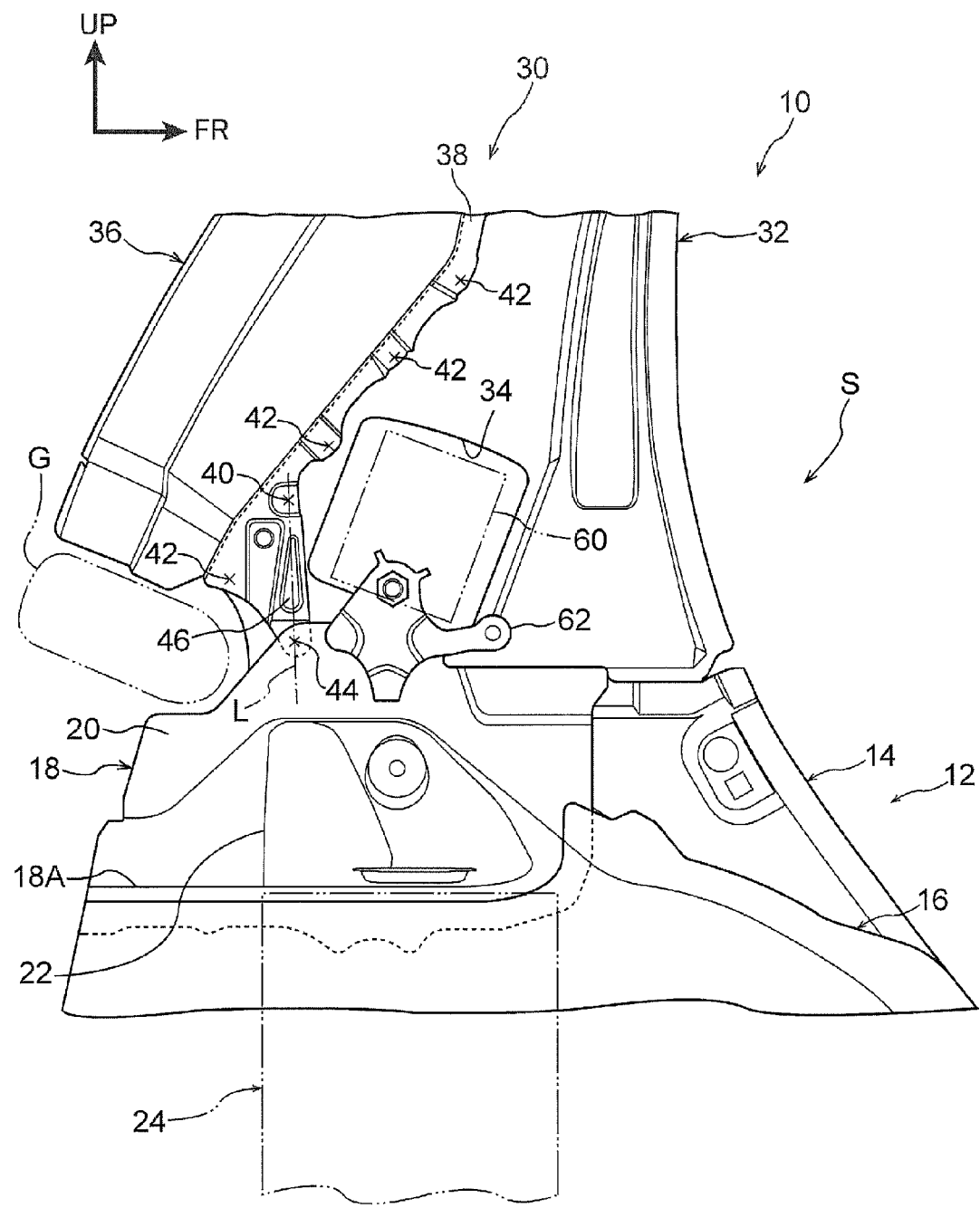
FIG. 1 is a side view illustrating relevant portions of a vehicle applied with a vehicle rear structure according to an exemplary embodiment, viewed from the vehicle interior (cabin interior) toward the vehicle width direction outside.
Figure 2:
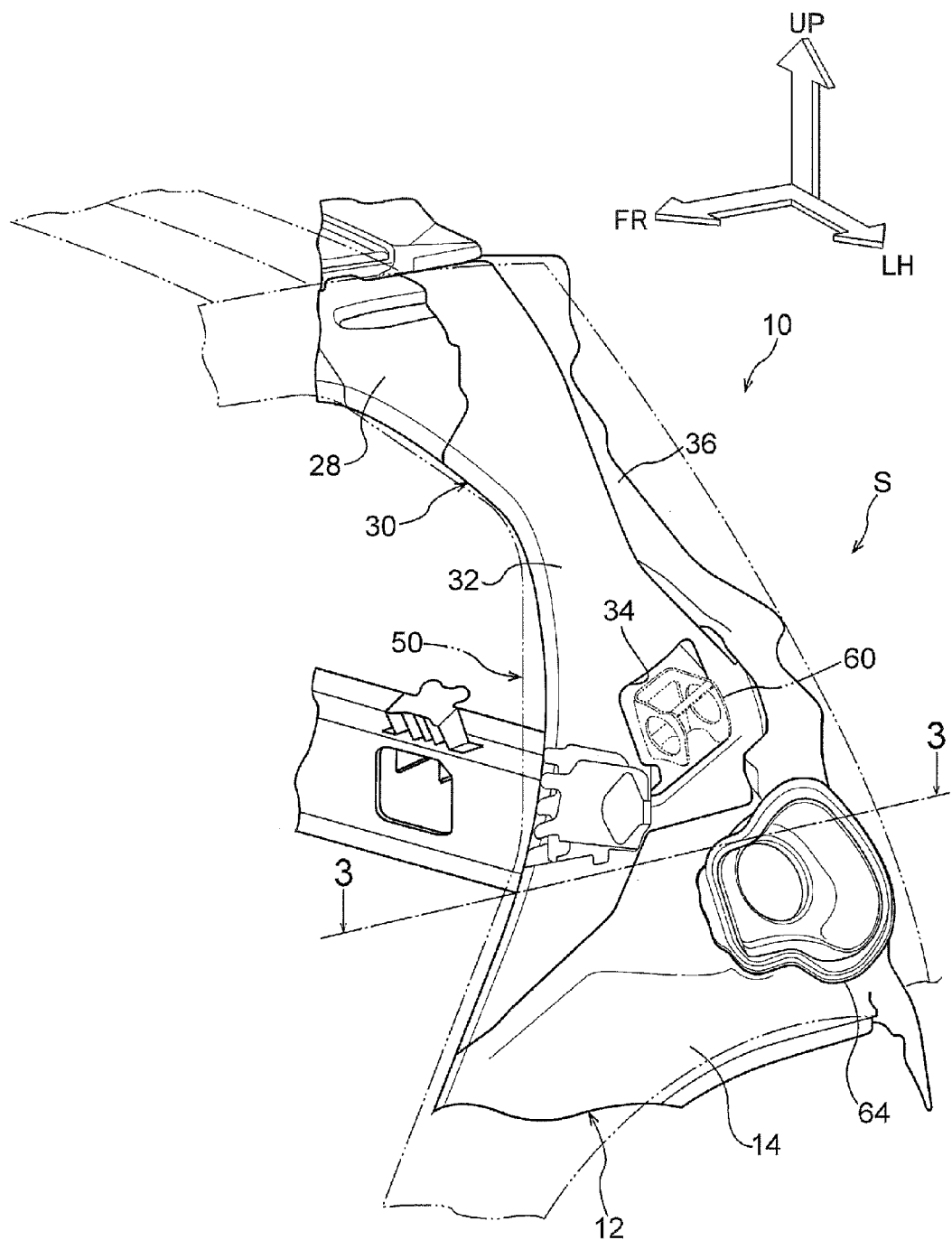
FIG. 2 is a perspective view illustrating the rear section of the vehicle illustrated in FIG. 1, viewed from the vehicle exterior toward the vehicle width direction inside.
Figure 3:
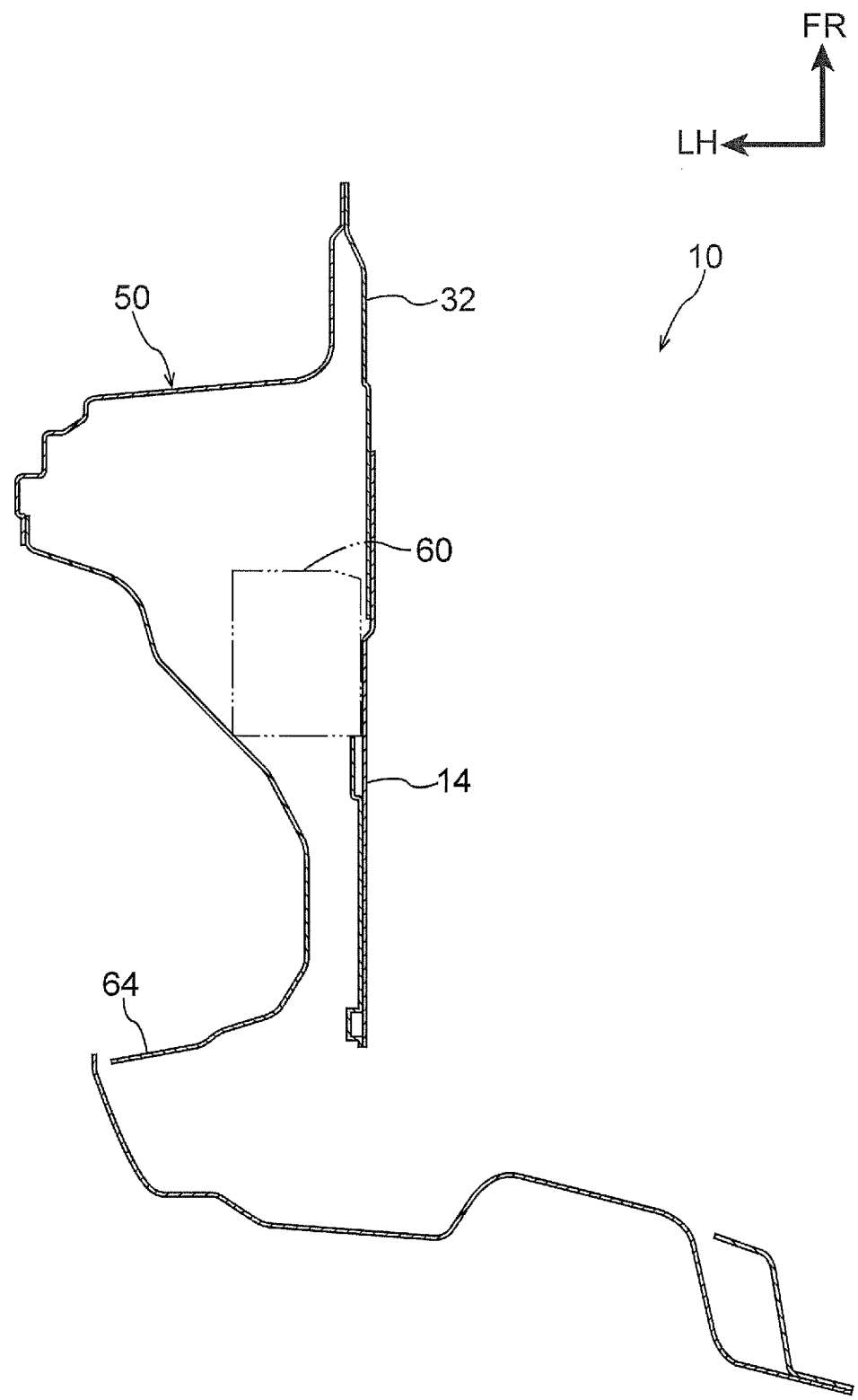
FIG. 3 is a cross-section illustrating the rear section of the vehicle illustrated in FIG. 2, viewed from the vehicle upper side (a cross-section taken along line 3-3 in FIG. 2).

Explanation follows regarding a vehicle 10 adopting a vehicle rear structure S according to an exemplary embodiment, with reference to FIG. 1 to FIG. 3. Note that in the drawings, the arrow FR indicates the vehicle front direction, the arrow LH indicates the vehicle left direction (one vehicle width direction side), and the arrow UP indicates the vehicle upper direction. Since the vehicle rear structure S is configured with left-right symmetry in the vehicle width direction of the vehicle 10, explanation is given regarding a vehicle left side of the rear section of the vehicle 10, and explanation regarding a vehicle right side of the rear section of the vehicle 10 is omitted.

FIG. 1 is a side view illustrating relevant portions of the vehicle 10 adopting the vehicle rear structure S, as viewed from the vehicle interior (the cabin interior) toward the vehicle width direction outside, and FIG. 2 is a perspective view illustrating the rear section of the vehicle 10, as viewed from the vehicle exterior toward the vehicle width direction inside. As illustrated in FIG. 1 and FIG. 2, the vehicle 10 is configured including a rear wheelhouse 12, an upper support 18 (not illustrated in FIG. 2) provided to the rear wheelhouse 12, and a roof-side inner 30 provided at the vehicle upper side of the upper support 18. Explanation follows regarding their respective configurations.

The rear wheelhouse 12 includes a wheelhouse outer 14 configuring a vehicle width direction outside portion of the rear wheelhouse 12, and the wheelhouse outer 14 is formed in a substantially semi-circular cylinder shape. As illustrated in FIG. 1, a wheelhouse inner 16 configuring a vehicle width direction inside portion of the rear wheelhouse 12 is provided at the vehicle width direction inside of the wheelhouse outer 14, and the wheelhouse inner 16 is formed in a substantially bottomed semi-circular cylinder shape bulging out toward the vehicle width direction inside. Although not illustrated in the drawings, a lower end portion of the wheelhouse inner 16 is joined to a vehicle body frame member extending in the vehicle longitudinal direction (not illustrated in the drawings), and an outer peripheral portion at the vehicle width direction outside of the wheelhouse inner 16 is joined by welding or the like to an outer peripheral portion at the vehicle width direction inside of the wheelhouse outer 14. The rear wheelhouse 12 covers an upper portion of a rear tire (not illustrated in the drawings) from the vehicle upper side.

The upper support 18 is formed in a substantial L shaped plate shape viewed from the vehicle rear side, and is provided at a vehicle upper side portion of the wheelhouse inner 16. An outer peripheral portion of a bottom wall 18A of the upper support 18 is joined by welding or the like to the wheelhouse inner 16, and a rear suspension 24 is coupled to the bottom wall 18A of the upper support 18.

A supporting side flange 20 is integrally formed to an outer peripheral portion of a side wall of the upper support 18, and the supporting side flange 20 is disposed with its thickness direction in the vehicle width direction, and joined by welding or the like to the wheelhouse outer 14. Reinforcement 22, with a substantially U-shaped cross-section open to the vehicle width direction outside and the vehicle lower side, is integrally formed to a substantially central portion of the upper support 18, and a side wall of the supporting side flange 20 and the bottom wall 18A are reinforced by the reinforcement 22.

Explanation follows regarding the roof-side inner 30, this being a relevant portion of the present invention. The roof-side inner 30 is disposed at the vehicle upper side of the upper support 18. The roof-side inner 30 is configured including a front roof-side inner 32 serving as a front side member configuring a vehicle front side portion of the roof-side inner 30, and a rear roof-side inner 36 serving as a rear side member configuring a vehicle rear side portion of the roof-side inner 30.

The front roof-side inner 32 is manufactured from sheet metal, and is disposed with its thickness direction in substantially the vehicle width direction. The front roof-side inner 32 is joined by welding or the like to both the upper support 18 and the wheelhouse outer 14, and extends from the upper support 18 and the wheelhouse outer 14 toward the vehicle upper side. An upper end portion of the front roof-side inner 32 is joined by welding or the like to a roof-side rail 28 extending in the vehicle longitudinal direction (see FIG. 2).

A substantially rectangular shaped hole 34 is formed to the front roof-side inner 32. A seatbelt retractor 60 (see FIG. 2) is disposed inside the hole 34, and the seatbelt retractor 60 is attached to the upper support 18 through a bracket 62 joined to the upper support 18.

The rear roof-side inner 36 is manufactured from sheet metal, and is disposed at the vehicle rear section of the front roof-side inner 32, with its thickness direction in substantially the vehicle width direction. A front edge of the rear roof-side inner 36 bends toward the vehicle width direction inside and then bends again toward the rear roof-side inner 36 side. Namely, the front edge of the rear roof-side inner 36 is formed in a stepped shape bulging toward the vehicle width direction inside, and this portion configures an overlap flange 38 serving as an overlap portion. The overlap flange 38 extends along a rear edge of the front roof-side inner 32, and is disposed overlapping a vehicle width direction outside face of the rear edge of the front roof-side inner 32. The overlap flange 38 is joined by welding to the rear edge of the front roof-side inner 32 in plural locations, and these joins configure first joins 40, 42 (note that, for ease of explanation, the first join disposed at the vehicle rear side of the hole 34 and disposed at the vehicle upper side of a second join 44, described later, is appended with the reference numeral 40, and the other first joins are appended with the reference numeral 42).

The rear roof-side inner 36 is joined by welding or the like at a lower end portion of the overlap flange 38 to the front roof-side inner 32 and the upper support 18. The join portion configures the second join 44, and the second join 44 is disposed at the vehicle rear side of the hole 34 of the front roof-side inner 32, and disposed at the vehicle lower side of the first join 40. Namely the first join 40 and the second join 44 are disposed aligned with each other in the vehicle height direction at the vehicle rear side of the hole 34.

A bead 46 is formed to the overlap flange 38 at a portion between the first join 40 and the second join 44, with the bead 46 bulging toward the vehicle width direction inside and extending along the vehicle height direction. Namely, the bead 46 extends so as to run along a line L passing through the first join 40 and the second join 44. The second join 44 and the rear suspension 24 are disposed overlapping each other in the vehicle height direction in side view. Namely, the first join 40, the bead 46, the second join 44, and the rear suspension 24 are disposed aligned in a row in the vehicle height direction in side view.

The rear roof-side inner 36 is disposed distanced from the upper support 18 toward the vehicle upper side at the vehicle rear side of the second join 44. A gap G is thereby formed between the rear roof-side inner 36 and the upper support 18 at a position at the vehicle rear side of the second join 44.

As illustrated in FIG. 2 and FIG. 3, a side outer panel 50 is disposed at the vehicle width direction outside of the roof-side inner 30. The side outer panel 50 is joined to the front edge and the rear edge of the roof-side inner 30, and together the roof-side inner 30 and the side outer panel 50 form a closed cross-section.

As illustrated in FIG. 2, the vehicle 10 includes a fuel inlet box 64 serving as a fuel inlet. The fuel inlet box 64 is disposed at the vehicle lower side of the seatbelt retractor 60 at the vehicle width direction outside of the roof-side inner 30, and is disposed overlapping the seatbelt retractor 60 in the vehicle width direction in plan view (see FIG. 3). In other words, the fuel inlet box 64 is disposed overlapping the seatbelt retractor 60 in the vehicle height direction in side view.

The fuel inlet box 64 is formed in a bottomed, substantially elliptical cylinder shape that opens toward the vehicle width direction outside, and an edge portion of the opening of the fuel inlet box 64 is joined to the side outer panel 50. A fuel inlet pipe (not illustrated in the drawings) is also coupled to a bottom wall of the fuel inlet box 64, and the opening of the fuel inlet box 64 is closed off by a fuel inlet lid (not illustrated in the drawings). Note that there is no fuel inlet box 64 provided at the vehicle right side of the rear section of the vehicle 10.

Explanation follows regarding operation and advantageous effects of the exemplary embodiment.

In the vehicle 10 to which the vehicle rear structure S configured as described above is applied, the upper support 18 is coupled to the rear suspension 24, and the roof-side inner 30 is coupled to the upper support 18. When the vehicle 10 is running, an upthrust load toward the vehicle upper side is input from the rear suspension 24 to the upper support 18, and the upthrust load is transmitted to the roof-side inner 30.

The roof-side inner 30 is configured including the front roof-side inner 32 configuring the vehicle front side portion of the roof-side inner 30, and the rear roof-side inner 36 configuring the vehicle rear side portion of the roof-side inner 30. The rear roof-side inner 36 includes the overlap flange 38, and the overlap flange 38 overlaps the rear edge of the front roof-side inner 32, and extends along the rear edge. The rear roof-side inner 36 is joined to the front roof-side inner 32 at the locations that are the first joins 40, 42 of the overlap flange 38. Since configuration is thereby such that the overlap flange 38 of the roof-side inner 30 has high strength, enabling rigidity of the roof-side inner 30 against the upthrust load from the rear suspension 24 to be increased by the overlap flange 38.

The rear roof-side inner 36 is joined to the front roof-side inner 32 and the upper support 18 at the location of the second join 44 of the overlap flange 38. Namely, the front roof-side inner 32, the rear roof-side inner 36, and the upper support 18 are joined together at the second join 44. The upthrust load from the rear suspension 24 is thereby effectively transmitted from the upper support 18 to the overlap flange 38, and distributed to the front roof-side inner 32 and the rear roof-side inner 36. This enables the rigidity of the roof-side inner 30 against the upthrust load from the rear suspension 24 to be secured.

The rear roof-side inner 36 is disposed distanced from the upper support 18 toward the vehicle upper side at the vehicle rear side of the second join 44. The gap G is thereby formed between the upper support 18 and the rear roof-side inner 36. The gap G can therefore be utilized as a working hole for use when, for example, attaching the fuel inlet box 64 to the vehicle 10, or when attaching a fuel cable in order to release the lock of the fuel inlet lid.

Since the gap G is formed at the vehicle rear side of the second join 44, the rear roof-side inner 36 is joined to the upper support 18 at the vehicle front side of the gap G. This enables suppression of deformation of the roof-side inner 30 due to the upthrust load from the rear suspension 24, even though the gap G is formed for use as a working hole.

The seatbelt retractor 60 and the fuel inlet box 64 provided at the vehicle width direction outside of the roof-side inner 30 are disposed overlapping each other in the vehicle height direction in side view. This enables setting of a shorter dimension of the roof-side inner 30 in the vehicle longitudinal direction (enables setting of a shorter overhang at the vehicle rear section of the vehicle 10).

In cases in which the seatbelt retractor 60 and the fuel inlet box 64 are disposed overlapping each other in the vehicle height direction in side view, it is difficult, for example, to extend a reinforcement member in the vehicle height direction to form a closed cross-section with the roof-side inner 30 at the vehicle width direction outside of the first join 40 to reinforce the roof-side inner 30. It would therefore be difficult to secure rigidity of the roof-side inner 30 against the upthrust load from the rear suspension 24 using such a reinforcement member. However, rigidity of the roof-side inner 30 is secured by the overlap flange 38, as previously described. This enables the rigidity of the roof-side inner 30 to be effectively secured against the upthrust load from the rear suspension 24 in vehicles in which a short overhang is set.

The first join 40 and the second join 44 are disposed aligned with each other in the vehicle height direction at the vehicle rear side of the hole 34. A vehicle rear side portion of the hole 34 of the front roof-side inner 32 is thereby reinforced by the portion between the first join 40 and the second join 44 of the overlap flange 38. This enables deformation of the hole 34 of the front roof-side inner 32 due to the upthrust load from the rear suspension 24 to be suppressed, even though the hole 34 is provided to the front roof-side inner 32 in order to place the seatbelt retractor 60.

The bead 46 is formed extending in the vehicle height direction at the portion between the first join 40 and the second join 44 of the overlap flange 38. This enables strength to be increased at the portion between the first join 40 and the second join 44 of the overlap flange 38. Deformation of the hole 34 of the front roof-side inner 32 due to the upthrust load from the rear suspension 24 can accordingly be further suppressed.

The second join 44 and the rear suspension 24 are disposed overlapping each other in the vehicle height direction in side view. The upthrust load from the rear suspension 24 can therefore be even more effectively transmitted to the second join 44, and distributed to the front roof-side inner 32 and the rear roof-side inner 36.

In the present exemplary embodiment, the rear roof-side inner 36 is joined by welding to both the front roof-side inner 32 and the upper support 18 at the second join 44. Alternatively, the front roof-side inner 32 and the rear roof-side inner 36 may be joined to the upper support 18 at the second join 44 by fastening members, such as nuts and bolts.

In the present exemplary embodiment, the gap G is formed to the second join 44; however a coupling member coupling the rear roof-side inner 36 and the upper support 18 may be separately provided at the position of the gap G. This enables the rigidity of the roof-side inner 30 against the upthrust load from the rear suspension 24 to be increased even further.

In the present exemplary embodiment, the seatbelt retractor 60 and the fuel inlet box 64 are disposed overlapping each other in the vehicle height direction in side view. Alternatively, both members may be disposed partially overlapping each other in the vehicle height direction in side view, or both members may have no overlap with each other in the vehicle height direction in side view. Namely, in vehicles in which a reinforcement member reinforcing the roof-side inner 30 cannot be provided, rigidity of the roof-side inner 30 against the upthrust load from the rear suspension 24 can be effectively secured by applying the vehicle rear structure S.

In the present exemplary embodiment, the first join 40 and the second join 44 are disposed aligned with each other in the vehicle height direction at the vehicle rear side of the hole 34; however the first join 40 and the second join 44 may be disposed such that the line L passing through the first join 40 and the second join 44 slopes at an angle to the vehicle height direction.

In the present exemplary embodiment, the bead 46 is formed between the first join 40 and the second join 44 of the overlap flange 38; however the bead 46 may be omitted.

The invention claimed is:

1. A vehicle rear structure comprising:
an upper support disposed at a vehicle upper side of a rear suspension;
a front side member that configures a vehicle front side portion of a roof-side inner provided at the vehicle upper side of the upper support, that is joined to the upper support, and that extends from the upper support toward the vehicle upper side; and
a rear side member that configures a vehicle rear side portion of the roof-side inner, that includes an overlap portion overlapping with a rear edge of the front side member and extending along the rear edge, that is joined to the front side member at the location of a first join on the overlap portion, and that is joined to the front side member and the upper support at the location of a second join on the overlap portion, wherein the rear side member is disposed distanced from the upper support toward the vehicle upper side at the vehicle rear side of the second join.

2. The vehicle rear structure of claim 1, wherein:

a seatbelt retractor and a fuel inlet are provided at the vehicle width direction outside of the roof-side inner, and the seatbelt retractor and the fuel inlet are disposed overlapping each other in the vehicle height direction in side view.

3. The vehicle rear structure of claim 2, wherein:

a hole where the seatbelt retractor is disposed is formed at the vehicle front side of the second join of the front side member; and the rear side member includes a plurality of the first joins, and at least one of the first joins is disposed at the vehicle rear side of the hole and at the vehicle upper side of the second join.

4. The vehicle rear structure of claim 3, wherein:

a bead that extends so as to run along a line passing through the at least one first join and the second join is formed to the overlap portion between the at least one first join and the second join.

5. The vehicle rear structure of claim 1, wherein the second join and the rear suspension are disposed overlapping each over in the vehicle height direction in side view.

* * * * *